United States Patent Office 3,126,228
Patented Mar. 24, 1964

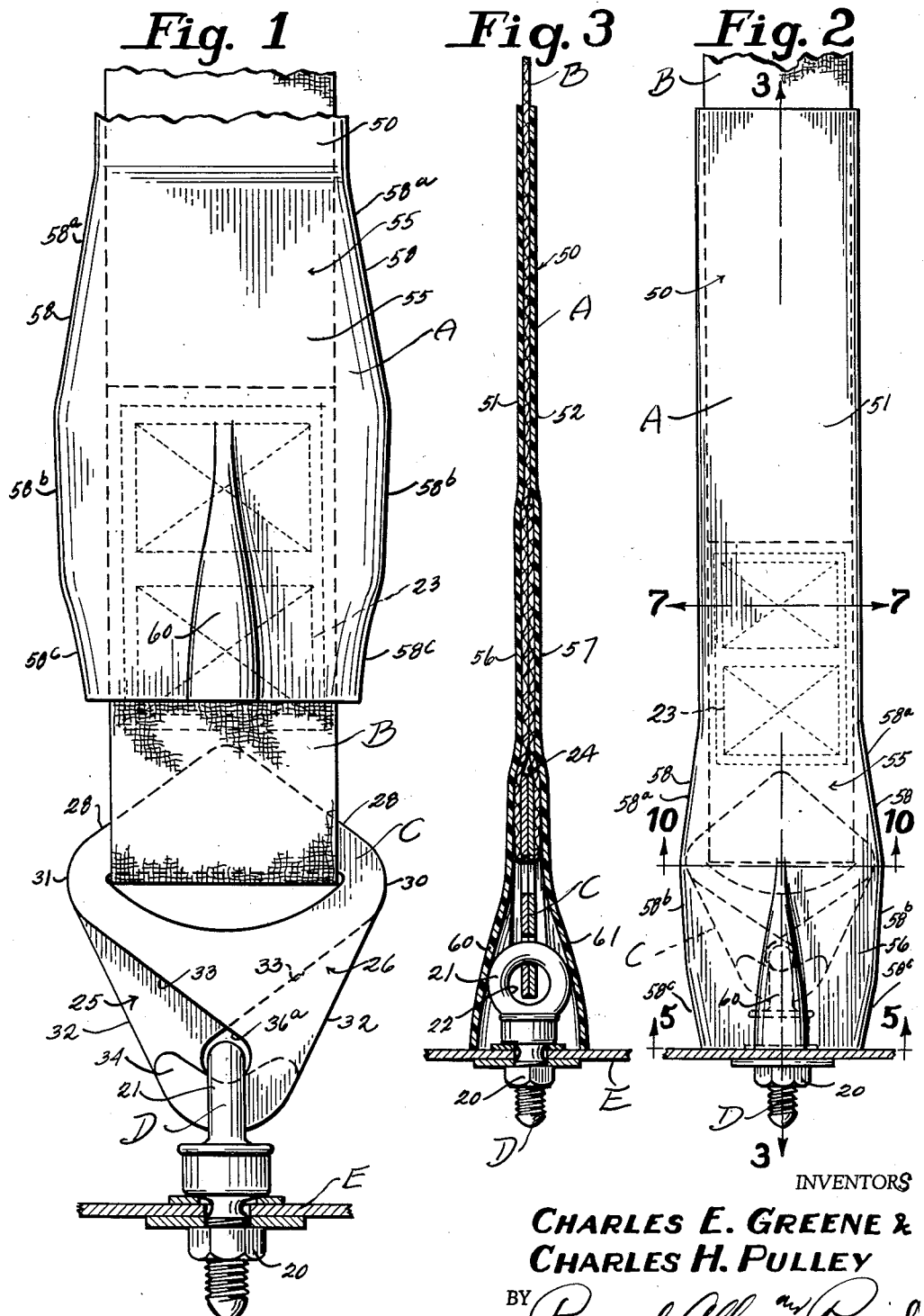

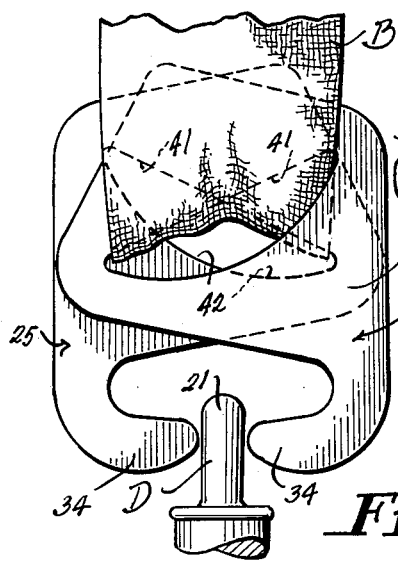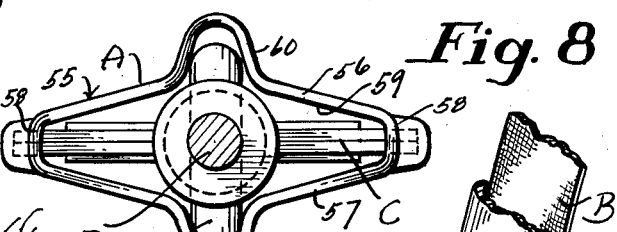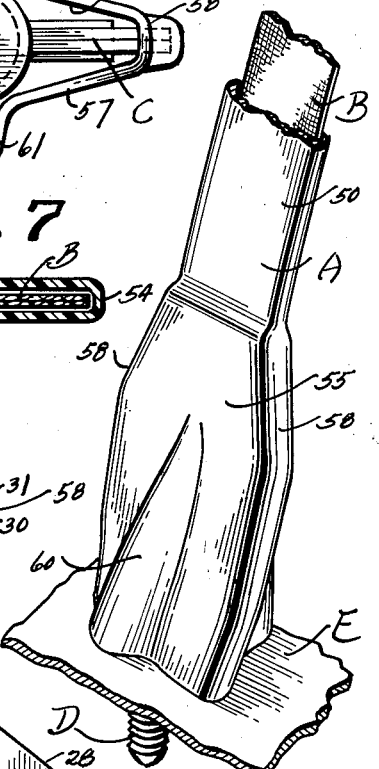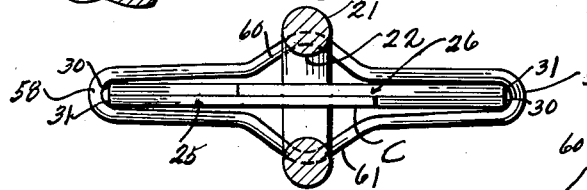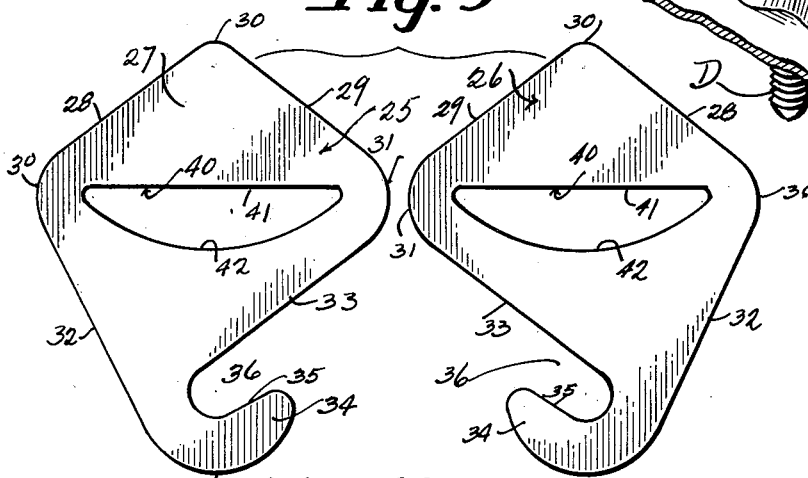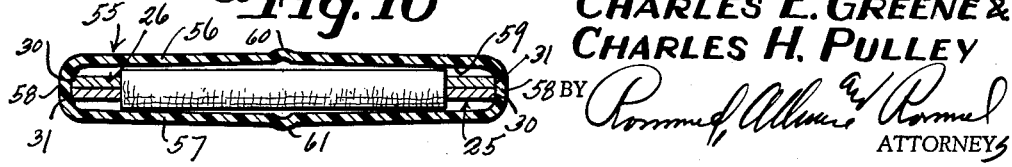

3,126,228
TWIN HOOK TYPE VEHICLE SAFETY BELT
AND GUARD BOOT THEREFOR
Charles E. Greene, Milford, Mich., and Charles H. Pulley, Lexington, Ky., assignors to Irving Air Chute Company, Inc., Lexington, Ky., a corporation of New York
Filed May 7, 1962, Ser. No. 192,832
4 Claims. (Cl. 297—385)

This invention relates to improvements in vehicle safety belt guard boots.

The primary object of this invention is the provision of a resilient and flexible guard boot or container adapted to be used at the bolting connection of safety straps to car frame for protecting the safety webbing; maintaining the same in safe connection, and improving the appearance thereof.

It is a further object of this invention to provide an improved safety belt having a twin-hook type of connector for securement to a bolt or like member or means attached to the vehicle frame, and to associate therewith an improved resilient and flexible type of boot or container attached to the webbing adapted to be slipped over a twin-hook connector for holding the same in housed connection with a bolt or like means secured to the vehicle frame and under such circumstances that the boot and the flexible webbing may have freedom of movement at the bolt connection in a direction transverse to the plane thereof.

Other objects and advantages of this invention will be apparent during the course of the following detailed description.

In the drawings, wherein for the purpose of illustration is shown a preferred embodiment of the invention:

FIGURE 1 is a fragmentary side elevation of the improved boot showing the same attached upon a safety belt or webbing material in position moved upwardly thereon to expose a twin-hook connector which secures the webbing to a bolt or like member attached to a vehicle frame.

FIGURE 2 is a side elevation of a safety belt with the boot in final position upon the safety belt, twin-hook connector and its bolting means.

FIGURE 3 is a vertical cross sectional view taken on the line 3—3 of FIGURE 2, and showing the boot in the safety webbing, its connector and its twin-hook connector and bolting means.

FIGURE 4 is a fragmentary view of the lower end of the safety webbing showing the twin-hooks of the connector spread apart as they would appear with respect to the safety webbing for attaching or detaching purposes of the same with respect to the vehicle connecting bolt.

FIGURE 5 is a cross sectional view taken substantially on the line 5—5 of FIGURE 2.

FIGURE 6 is an end view of the boot as laterally expanded for the purpose of slipping the same over the wide portions of the twin hooks; the view showing the bolt head in cross section.

FIGURE 7 is a cross sectional view taken substantially on the line 7—7 of FIGURE 2.

FIGURE 8 is a perspective view showing the boot as applied over the twin hooks and safety belt webbing material at the vehicle attached end thereof.

FIGURE 9 is a developed side elevation of the two portions of the twin hooks, showing the similar structure thereof.

FIGURE 10 is a cross sectional view taken substantially on the line 10—10 of FIGURE 2.

In the accompanying drawings forming a part of this specification, and wherein similar reference characters designate corresponding parts throughout the several views, the letter A may generally designate the improved boot which is adapted to be slipped over the safety belt or strap connected end of webbing B. A twin-hook structure C is provided, attached movably upon the doubled end of the webbing B, adapted for detachable connection with a bolt D secured to a vehicle frame E.

The frame E may consist of a wall or floor of the vehicle, and to it is detachably connected the bolt by means of a nut 20; the bolt having an eye head 21 with an opening 22 therein adapted to receive the detent ends of the twin hooks of connector C.

The webbing B is usually of woven nylon, rather stiff against movement laterally of the plane width thereof, but freely flexible across the thickness thereof. It is doubled upon itself at the twin-hook attaching end and stitched as shown at 23 in FIGURES 1 and 2 of the drawings to provide a loop opening 24 adapted to receive the parts of the twin-hook assemblage C.

Twin hooks per se are notoriously old, although in the present invention there is some modification of the usual twin hook, so far as the eye opening and the parts thereof are concerned. The twin hooks C comprise the complementary parts 25 and 26 of identical construction, each having a head portion 27 the upper edges 28 and 29 of which slope divergently away from each other from an apex 30. At their ends the sides 28 and 29 are convexly curved at 30 and 31; the distance between the edges 30 and 31 constituting the widest portion of each part 25 and 26. From the curved edges 30 and 31 the head 27 has side edges 32 and 33 which slope convergently downward to a hook shaped detent portion 34, the hooked end of which has an edge 35 substantially paralleling the edge 33 and defining a channel 36 adapted to receive the head of the eye bolt D therein. The edge 38 of each part 25 and 26 leading to the detent end 34 is convexed to enable ready camming of the hooked ends of the parts 25 and 26 over the eye of the bolt. The novelty in the members 25 and 26 resides in the eye opening 40 provided in each which is of elongated shape, the upper edge 41 of which is rectilinear, and the bottom edge 42 of which is concavely curvilinear. The eye opening 40 thus decreases in depth from each end thereof to a location midway of the ends of the eye opening 40.

The looped end of the webbing B is threaded through the openings 40 of the twin hooks 27 and 28; with the complementary twin hooks superposed with respect to each other. The width of the webbing is such as to nearly touch the ends of the eye opening 40 at the side margins thereof, so that normally with the webbing B under tension the twin hooks 25 and 26 will assume the positions shown in FIGURE 1, to swing their detent ends 34 inwardly towards each other for the purpose of locking the eye head of the bolt D in the thus provided opening designated at 36ᵃ in FIGURE 1 of the drawings.

In order to open the twin hooks it is necessary to manually swing them to the position shown in FIGURE 4 for spreading apart the detent ends 34. In doing this the webbing B is laterally deformed and placed under stress; the eyes 40 of the two hooks then not coinciding in parallelism with each other, but lying in X-shaped relation. The fact that the edge 42 is curvilinear and that the depth of the openings 40 increases towards the center enables an easy swinging of the twin hooks to this position under some manual effort for the purpose of releasing the twin hooks from the eye bolt or for attachment thereto. When the manual force necessary to laterally stress the webbing B is released the lateral force inherent in the webbing will swing the hooks 25 and 26 to their closed positions, as shown in FIGURE 1.

It will be noted, as shown in FIGURE 1 of the drawings, that when the twin hooks are closed the edges 32 lie in relative downward convergence, and the edges 38 are flush with each other.

The improved boot A is constructed of plastic, rubber or any flexible sufficiently resilient material. It is of tubular formation, including an elongated belt receiving flat section 50 adapted to snugly but slidably receive the webbing B therein in threaded relation therethrough. This portion 50 includes front and rear walls 51 and 52 and side walls 53 and 54 defining a passageway for receiving the webbing. A lower enlarged skirt portion 55 of the boot A comprises a rear wall 56 which is a continuation of the wall 51 of portion 50 and an outer wall 57 which is a continuation of the wall 52, and the same has side walls 58 to define a normally flat opening 59 adapted to receive the lower end of the webbing B therein and also the twin hook and eye bolt assemblages. It is to be noted that the portion 50 is of uniform width throughout the length thereof, but at its junction with the portion 55, the edges 58 are sloped out of line therewith in relative divergence at 58$^a$ to widen the portion 55 at the upper end thereof. From there the edges 58 slope slightly in convergence or are parallel each other at 58$^b$ and from there the edges 58 more acutely converge at 58$^c$ with respect to each other. Thus, the passageway 59 through the portion 55 at its upper end is about as wide as the passageway through the upper portion 50 of the boot, but therefrom the passageway 59 widens gradually along the edges 58$^a$ and from thence downwardly along the edges 58$^b$ the passageway 59 is about uniform, and the passageway 59 through the lower portion of the boot at the edges 58$^c$ is gradually restricted in width.

It should be noted that the width of the assembled twin hooks from edge 30 to 31 of the hooks when they are closed is greater than the width of the passageway 59 through the lower portion having the sloping edges 58$^c$ and the width of the assembled twin hooks between the edges 30 and 31 is also greater than the width of the passageway 59 between the edges 58$^b$. Thus, when the resilient boot is lowered over the twin hooks and assembled on the eye bolt B its lower end between the edges 58$^c$ will have to be laterally expanded to ride over the edges 30 and 31 of the assembled twin hooks and when the boot is brought to its final position as shown in FIGURE 2 the inner surfaces of the walls 58 grip the edges 30 and 31 of the twin hooks and hold the hooks in locked position, as is shown in FIGURE 2. Thus the boot A cannot slip upwardly along the webbing B except under the use of manual force.

The walls 56 and 57 of the lower portion 55 of the boot normally lie parallel to each other except when the boot is assembled upon the bolt and the hook assemblage, as shown in FIGURE 10 of the drawings. However, these walls 56 and 57 have formed thereon midway between the edges 58 elongated bight or looped portions 60 and 61 the upper terminals of which lie somewhere in the portion of the side walls between the edges 58$^b$ and downwardly therefrom the said looped or bight portions 60 and 61 enlarge in width and depth, sloping divergently downward. These looped portions 60 and 61 provide sockets for receiving the head 21 of the bolt D, as is shown in FIGURE 3.

Since the material of the boot is resilient the bight portions or loops 60 and 61 enable the operator to more easily expand the boot over or release the same from the twin hooks. As is shown in FIGURE 1 the portion 55 of the boot is shaped just as above described and holds this set position except when laterally expanded under force.

As is shown in FIGURE 2 the wider portions between the edges 30 and 31 of the twin hooks lie in a zone between the top and bottom ends of the portion 55 and as shown in FIGURE 3 the head 21 lies in the socket openings of the bight portions 60 and 61. FIGURE 6 shows the end of the boot or sleeve expanded to slip it over the twin hook buckle.

It will be noted that the boot A entirely covers all of the hook and bolting structure above the floor board of the vehicle thus acting as a guard in addition to safetying and locking the twin hooks.

Various changes in the size, shape and arrangement of parts may be made to the form of invention herein shown and described without departing from the spirit of the invention or scope of the claims.

I claim:

1. In combination with a flexible flat type vehicle safety belt, a twin-hook type connector including relatively movable portions connected to an end of the belt, a frame attachable bolt having an eye therein adapted to receive the twin hooks in releasable engagement therethrough, and a resilient type flexible boot having an upper portion slidably receiving in snug relation therein the lower portion of the belt and having a lower portion laterally enlarged in the plane of the lower portion and removably receiving the twin hooks therein in firm engagement with the opposite side edges of the twin hooks for holding both of them in closed locked relation in the eye of the bolt.

2. In a safety belt structure for vehicles and the like the combination of flat-type safety belt webbing, a twin hook connector comprising a pair of flat hooks having openings therethrough at the upper ends thereof and having lower hooked ends, the belt being threaded through said openings to normally hold said hooks in superposed parallel relation with the lower hooked ends overlapping in opposed facing relation, and a guard boot of resilient flexible material comprising flat walls connected at the side margins thereof defining passageways slidably receiving the webbing and twin hooks therethrough, the lower end of said boot having its passageway widened and then restricted as to width in the direction of the lowermost end thereof whereby to engage the side edges of said twin hooks when assembled in closed relation for the purpose of holding them locked.

3. The safety belt structure as defined in claim 2 in which a bolt is provided with an eye head having a transverse passageway therethrough receiving the lower hooked ends of said flat hooks, the lower end of the boot on the opposite flat walls thereof spaced from and between the side margins thereof being provided with narrow flexible longitudinally extending bulges providing sockets facing the passageway through said boot to receive therein the eye of the bolt.

4. In a safety belt assemblage the combination of a safety belt web of shallow thickness and of considerable width having a looped end, a pair of flat twin hooks having the looped end of the webbing connected thereto so the hooks can swing in the plane of the webbing, said hooks having the outer side edges of their upper portions converging in a downward direction and the lower ends thereof having detent hooked ends, a bolt having an eye head provided with a passageway adapted to laterally receive the detent hooked ends of said hooks, and a resilient type sleeve-like boot provided with flat flexible walls extending from the upper end thereof to the lower end thereof, the lower portions of the boot walls spaced from and between the side margins thereof each having a vertically elongated tapered flexible bight portion defining a socket facing the passageway through said boot receiving the eye of the bolt in releasably socketed relation therein.

References Cited in the file of this patent
UNITED STATES PATENTS 2,653,368   Elsner _____ Sept. 29, 1953
3,046,056   Greene _____ July 24, 1962